(12) United States Patent
Hitch et al.

(10) Patent No.: US 7,267,633 B2
(45) Date of Patent: Sep. 11, 2007

(54) TRANSMISSION CONTROL METHOD FOR INCREASING ENGINE IDLE TEMPERATURE

(75) Inventors: Ronald P. Hitch, Westfield, IN (US); Kevin L. Kluemper, Monrovia, IN (US)

(73) Assignee: General Motors Corporation, Detroit, MI (US)

( * ) Notice: Subject to any disclaimer, the term of this patent is extended or adjusted under 35 U.S.C. 154(b) by 150 days.

(21) Appl. No.: 10/877,496

(22) Filed: Jun. 25, 2004

(65) Prior Publication Data

US 2005/0288150 A1 Dec. 29, 2005

(51) Int. Cl.
*F16H 59/00* (2006.01)

(52) U.S. Cl. .......................... 477/98; 477/59; 477/60; 477/94; 475/62; 475/117; 192/3.24; 192/3.34

(58) Field of Classification Search ................ 477/59, 477/60, 94, 98; 475/61, 62, 64, 117, 122, 475/123; 192/3.23, 3.24, 3.34

See application file for complete search history.

(56) References Cited

U.S. PATENT DOCUMENTS

| | | | |
|---|---|---|---|
| 2,281,118 A * | 4/1942 | Smirl | 192/3.34 |
| 4,070,927 A | 1/1978 | Polak | |
| 4,730,708 A * | 3/1988 | Hamano et al. | 477/114 |
| 5,131,293 A * | 7/1992 | Kaiser et al. | 477/98 |
| 5,601,506 A | 2/1997 | Long et al. | |
| 5,954,618 A * | 9/1999 | Mikami et al. | 477/174 |
| 6,584,393 B1 * | 6/2003 | Vollmar | 701/55 |
| 6,829,528 B1 * | 12/2004 | Kang et al. | 701/51 |
| 6,935,989 B2 * | 8/2005 | Shibagaki | 477/98 |
| 2002/0098943 A1 * | 7/2002 | Shultz et al. | 477/94 |
| 2003/0050150 A1 * | 3/2003 | Tanaka et al. | 477/62 |
| 2003/0232696 A1 * | 12/2003 | Shibagaki | 477/76 |
| 2005/0034449 A1 * | 2/2005 | Frieden et al. | 60/284 |

\* cited by examiner

*Primary Examiner*—David D. Le

(57) ABSTRACT

The state of a fluid coupling in a motor vehicle powertrain is selectively controlled during neutral idle operation of the engine for increasing the engine temperature to a desired level. The fluid coupling includes an input member connected to the engine and an output member connected to the transmission, and the output member is selectively grounded under specified enable conditions to impose an engine load for raising the engine operating temperature. The output member is released to resume normal operation of the powertrain when the enable conditions are no longer met or an estimate of the fluid temperature in the coupling reaches or exceeds a predefined temperature.

12 Claims, 3 Drawing Sheets

| CLUTCH RANGE | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |
| LT | | | X | X | | ively increasing the engine temperature during idle.
TRANSMISSION CONTROL METHOD FOR INCREASING ENGINE IDLE TEMPERATURE

TECHNICAL FIELD

The present invention relates to the control of a motor vehicle powertrain including an internal combustion engine coupled to a power transmission through a fluid coupling, and more particularly to a transmission control for selectively increasing the engine temperature during idle.

BACKGROUND OF THE INVENTION

In most motor vehicle powertrains, the heat generated due to operation of the engine is advantageously utilized, not only for cabin heating, but also for heating various exhaust gas emission control devices such as catalytic converters and particulate traps. While the heat generated during normal vehicle operation is sufficient for these purposes, the heat generated during idle operation can be insufficient, particularly during extended idle operation of a diesel engine. As a result, warming up the cabin during cold ambient temperatures can take an undesirably long time, and the exhaust gas temperature may be insufficient to activate the emission control devices. Accordingly, what is needed is a way of selectively and controllably increasing the engine temperature during idle operation.

SUMMARY OF THE INVENTION

The present invention is directed to an improved method of operation for a motor vehicle powertrain including an internal combustion engine coupled to a power transmission through a fluid coupling, where a friction device of the transmission controls the state of the fluid coupling during neutral idle operation of the engine for increasing the engine temperature to a desired level. The fluid coupling includes an input member connected to the engine and an output member connected to the transmission, and the transmission friction device selectively grounds the output member under specified enable conditions to load the engine for raising the engine operating temperature. The friction member is released to resume normal operation of the fluid coupling when the enable conditions are no longer met or an estimate of the fluid temperature in the coupling exceeds a predefined temperature.

DESCRIPTION OF THE PREFERRED EMBODIMENT

Figures 1, 2:
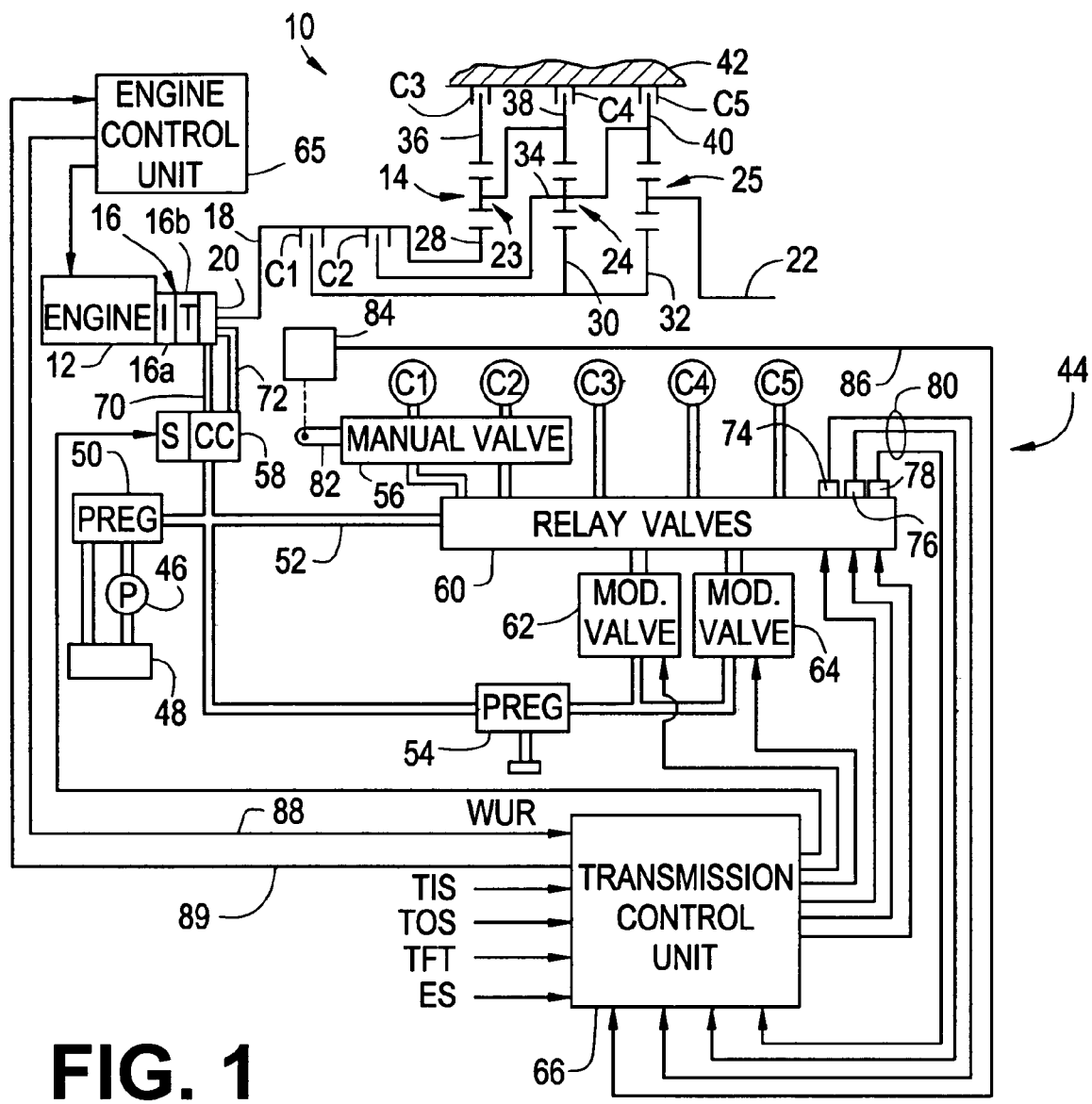
FIG. 1 is a diagram of a motor vehicle powertrain including an engine, a fluid coupling, an automatic transmission and a microprocessor-based transmission control unit for carrying out the method of this invention.
FIG. 2 is a chart depicting the clutch states of the transmission of FIG. 1 for establishing various transmission speed ratios and the locked turbine mode of this invention.

Referring to FIG. 1, the method of the present invention is disclosed herein in the context of a motor vehicle powertrain 10 including a diesel engine (ENG) 12 and a multi-ratio power transmission 14 having a planetary gearset of the type described in the U.S. Pat. No. 4,070,927 to Polak and an electro-hydraulic control of the type described in U.S. Pat. No. 5,601,506 to Long et al., such patents being incorporated herein by reference. Accordingly, the gearset and control elements shown in FIG. 1 hereof have been greatly simplified, it being understood that further detail regarding the fluid pressure routings and so forth may be found in the aforementioned patents.

The engine 12 is coupled to the transmission 14 through a fluid coupling such as the torque converter 16. An input member or impeller (I) 16a of the torque converter 16 is connected to an output shaft of the engine 12 and an output member or turbine (T) 16b of the torque converter 16 is connected to an input shaft 18 of the transmission 14. While torque is ordinarily transferred through the torque converter 16 with slippage between the impeller 16a and turbine 16b, the powertrain 10 includes a torque converter clutch 20 that is selectively engaged under certain conditions to provide a mechanical coupling between engine 12 and transmission input shaft 18. The transmission output shaft 22 is coupled to the driving wheels of the vehicle in one of several conventional ways.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1-C5 (i.e., engaged or disengaged) can be controlled to provide six forward gears (1st-6th), a reverse (R) gear, a neutral (N) mode, or the locked-turbine (LT) mode of the present invention. As indicated, clutches C1 and/or C2 are engaged during operation of the forward gears, and the clutch C5 is engaged during the neutral (N) mode. The clutch C3 is engaged along with clutch C5 to perform a neutral-to-reverse range shift, while the clutches C3 and C4 are engaged to establish the locked-turbine mode during which the turbine 16b of torque converter 16 is coupled to ground 42.

The establishment of a locked-turbine mode is unique to the present invention, and when invoked during engine idle while the transmission is in the Neutral (N) mode, causes the torque converter 16 to load the engine 12. To the engine 12, the locked-turbine mode is equivalent to stationary operation in a forward or reverse gear, but in this case, there is no driving connection between input shaft 18 and output shaft 22. Referring to FIG. 1, it will be seen that concurrently engaging clutches C3 and C4 locks the planetary gearset 23, thereby preventing rotation of the torque converter turbine 16b.

The torque converter clutch 20 and the transmission clutches C1-C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 activated by a driver-manipulated shift selector (not shown) via linkage arm 82 and a number of solenoid operated fluid control valves 58, 60, 62, 64.

The electronic portion of the control is primarily embodied in the engine control unit (ECU) 65 and the transmission control unit (TCU) 66, illustrated in FIG. 1 as two separate modules. Both control units 65, 66 are microprocessor-based, and may be conventional in architecture. The ECU 65 controls the operation of engine functions depending on the control variables afforded by engine 12, and the TCU 66 controls the solenoid operated fluid control valves 58, 60, 62, 64 based on a number of inputs to achieve a desired transmission speed ratio. The inputs to TCU 66 include signals representing the transmission input speed TIS, engine speed ES, a driver torque request TQ, the transmission fluid temperature TFT, and the transmission output speed TOS. Sensors for developing such signals may be conventional in nature, and have been omitted for simplicity. Additionally, ECU 65 supplies a warm-up request (WUR) to TCU 66 via line 88, and TCU 66 supplies engine-related commands and transmission status information to ECU 65 via line 89.

The linkage arm 82 of manual valve 56 is coupled to a sensor and display module 84 that produces a signal on line 86 based on the control lever position. Such signal is conventionally referred to as a PRNDL signal, since it indicates which of the transmission ranges (Park, Reverse, Neutral, Drive or Low) has been selected by the driver-manipulated shift selector. Finally, the relay valves 60 are provided with pressure switches 74, 76, 78 for supplying diagnostic signals to TCU 66 on lines 80 based on the respective relay valve positions. The TCU 66 monitors the various diagnostic signals for the purpose of electrically verifying proper operation of the controlled elements.

The solenoid operated fluid control valves 58, 60, 62, 64 are generally characterized as being either of the on/off or modulated type. The Relay Valves 60 comprise a set of three on/off valves that are utilized in concert with manual valve 56 to enable controlled engagement and disengagement of each of the clutches C1-C5 with only two modulated valves 62, 64. For any selected gear, TCU 66 activates a particular combination of Relay Valves 60 for coupling one of the modulated valves 62, 64 to the on-coming clutch, and the other modulated valve 62, 64 to the off-going clutch. The modulated valves 62, 64 each comprise a conventional pressure regulator valve biased by a variable pilot pressure that is developed by current controlled force motor. The fluid controlled valve (CC) 58 is also a modulated valve, and controls the supply fluid supply path to converter clutch 20 in lines 70, 72 for selectively engaging and disengaging the converter clutch 20. The TCU 66 determines pressure commands for smoothly engaging the on-coming clutch while smoothly disengaging the off-going clutch, develops corresponding force motor current commands, and then supplies current to the respective force motors in accordance with the current commands.

The present invention is particularly directed to a control method carried out by TCU 66 for selectively establishing the locked-turbine (LT) mode of transmission 14 during engine idle operation in Park or Neutral for raising the engine operating temperature. This can significantly reduce the warm-up time of the vehicle cabin during cold ambient conditions and can maintain high exhaust gas temperatures for proper operation of various exhaust gas emission control devices such as particulate traps which must be periodically regenerated to burn off accumulated particulates. Since using the locked-turbine mode also increases the fluid temperature in the torque converter 16, the method of the present invention additionally encompasses estimating the fluid temperature in the torque converter 16 and exiting the locked-turbine mode when the estimated temperature exceeds a predefined temperature threshold.

Figure 3:
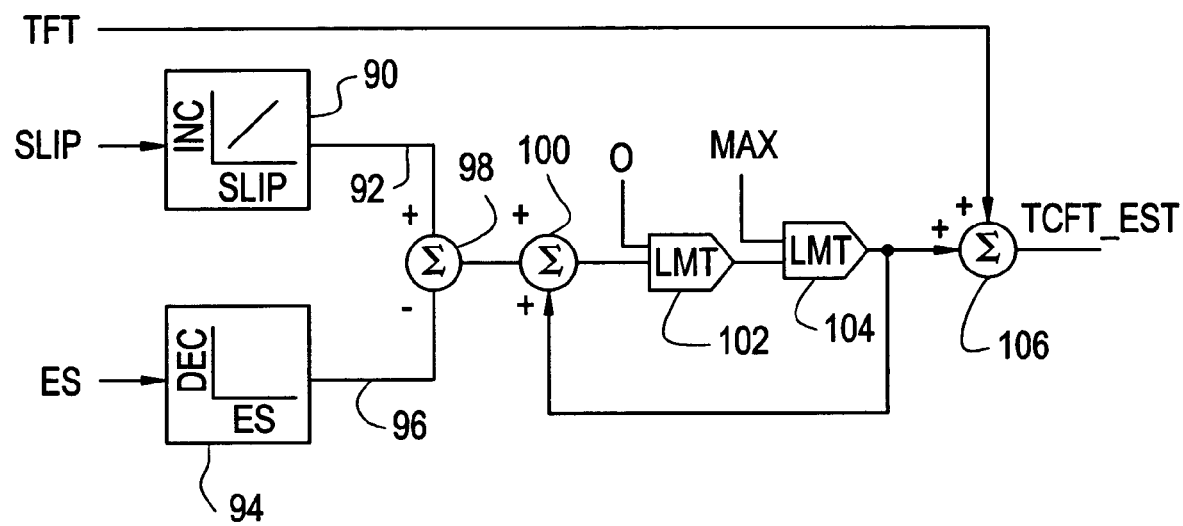
FIG. 3 is a block diagram of a software routine carried out by the transmission control unit of FIG. 1 for estimating the fluid temperature in the fluid coupling of FIG. 1.

The block diagram of FIG. 3 represents a software routine periodically executed by TCU 66 for estimating the fluid temperature (TCFT_EST) in the torque converter 16 based on the measured transmission fluid temperature TFT, the torque converter slip and the measured engine speed ES. The converter slip can be calculated as the difference between engine speed ES and the transmission input speed TIS. The converter fluid temperature estimation involves developing a non-negative temperature offset (TEMP_OFFSET) that is added to TFT to form TCFT_EST. A first look-up table 90 produces an output on line 92 for increasing TEMP_OFFSET with increasing converter slip speed, while a second look-up table 94 produces an output on line 96 for decreasing TEMP_OFFSET with increasing engine speed ES, recognizing that the speed of pump 46 (and hence, the fluid flow through the torque converter 16) increases with increasing engine speed ES. The block 98 subtracts the output of second look-up table 94 from the output of first look-up table 90 to produce a temperature increment which is added to the current value of TEMP_OFFSET by summer 100. The blocks 102 and 104 respectively limit TEMP_OFFSET to no less than zero and no more than a calibrated maximum value MAX. And finally, the summer block 106 forms TCFT_EST according to the sum of TEMP_OFFSET and TFT.

Figure 4:
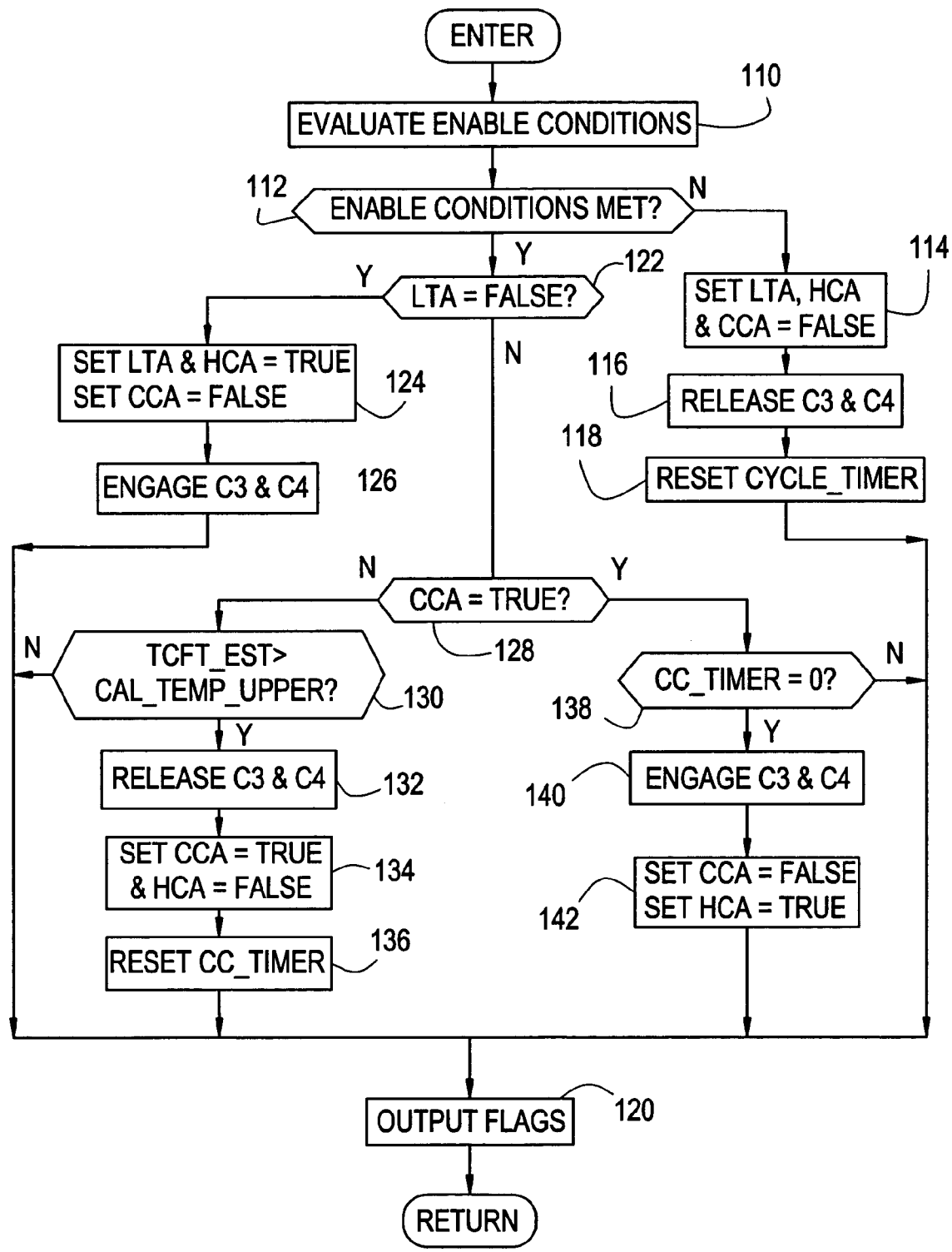
FIG. 4 is a flow diagram representing a software routine carried out by the transmission control unit of FIG. 1 for regulating the operation of the fluid coupling of FIG. 1 for increasing engine operating temperature.

The flow diagram of FIG. 4 represents a software routine periodically executed by TCU 66 for selectively entering and exiting the locked-turbine mode according to this invention. The block 110 is first executed to evaluate various enable conditions, including some or all of the following: (1) range selector in Park, (2) vehicle service brakes released, (3) transmission output speed=0, (4) engine speed below a threshold, (5) engine throttle position below a threshold, (6) engine output torque below a threshold, (7) engine coolant temperature below a threshold, (8) transmission fluid temperature TFT below a threshold, and (9) warm-up request issued by ECU 65. Additionally, block 110 will evaluate the status of a CYCLE_TIMER, discussed below. Of course, the number and nature of the enable conditions will vary depending on signal availability, vehicle manufacturer preference, and other factors. Various hysteresis thresholds and/or timers may be employed in connection with one or more of the enable conditions as well. Also, interactive control between ECU 65 and TCU 66 is possible, as explained below.

If the enable conditions for the locked-turbine mode are not met, block 112 is answered in the negative, and the blocks 114, 116 and 118 are executed to set the Locked Turbine Active (LTA), Heating Cycle Active (HCA) and Cooling Cycle Active (CCA) status flags to FALSE, to release clutches C3 and C4, and to reset the CYCLE_TIMER to a value such as five seconds. The block 120 outputs the flag states to ECU 65, and the routine is exited. Resetting the CYCLE_TIMER at this time serves to prevent rapid re-initiation of the locked-turbine mode when one or more of the enable conditions are momentarily not satisfied, since the CYCLE_TIMER itself is one of the enable conditions. In cases where the ECU 65 has requested engine warm-up and the routine sets the LTA flag to FALSE to indicate that the locked-turbine mode is not available, the ECU 65 can initiate alternative measures to increase the engine temperature, such as raising the engine idle speed.

When the enable conditions for the locked-turbine mode are met, block 112 is answered in the affirmative, and blocks 122-142 are executed to initiate the locked-turbine mode and to advise ECU 65 of the control status via the HCA and CCA flags so that the ECU 65 can model the load and heat generated in the system for determining if the engine control objectives are being met. First, the block 122 determines if the LTA flag is FALSE. Block 122 is initially answered in the affirmative due to the prior execution of block 114, and the blocks 124 and 126 are executed to set the LTA, HCA flags to TRUE, to set the CCA flag to FALSE, and to engage clutches C3 and C4 to initiate the locked-turbine mode. As above, the block 120 outputs the flag states to ECU 65, and the routine is exited.

In the next execution of the routine, block 122 will be answered in the negative due to the prior execution of block 124, and the blocks 128-142 are executed to determine if the locked-turbine mode should be temporarily exited to prevent over-heating of the torque converter 16. First, the block 128 determines if the Cooling Cycle Active (CCA) flag is TRUE. Initially, the block 128 will be answered in the negative (also due to the prior execution of block 124), and the block 130 is executed to determine if the estimated torque converter fluid temperature TCFT_EST is above a calibrated threshold CAL_TEMP_UPPER such as 105° C. If not, the routine is exited; if so, the blocks 132, 134 and 136 are executed to release clutches C3 and C4 to exit the locked-turbine mode, to set the CCA flag to TRUE, to set the HCA flag to FALSE, and to reset a cooling cycle timer CC_TIMER to a value such as sixty seconds. Setting the CCA flag to TRUE results in an affirmative answer to block 128 in the next execution of the routine, whereafter the block 138 checks the CC_TIMER to determine if the locked-turbine mode should be re-established. If the CC_TIMER has not returned to zero, the block 120 outputs the flag states to ECU 65, and the routine is exited. If the CC_TIMER has returned to zero, the blocks 140 and 142 are executed to engage clutches C3 and C4 for re-establishing the locked-turbine mode, to set the CCA flag to FALSE, and to set the HCA flag to TRUE. Thus, the CC_TIMER establishes a minimum cooling time for the torque converter fluid.

In summary, the method of the present invention utilizes the transmission friction elements to selectively ground the torque converter turbine 16b for purposes of raising the engine operating temperature under specified conditions. The method is carried out in a way that is self-limiting and virtually imperceptible to the operator of the vehicle, while effectively achieving the desired objectives of reducing cabin warm-up time and increasing the engine exhaust gas temperature.

While the method of the present invention has been described with respect to the illustrated embodiment, it is recognized that numerous modifications and variations in addition to those mentioned herein will occur to those skilled in the art. For example, the powertrain components may be different than shown herein, a manual disable control input may be used, and so on. Also, other controls such as an engine high-idle control can be used in concert with the described control. Accordingly, it is intended that the invention not be limited to the disclosed embodiment, but that it have the full scope permitted by the language of the following claims.

The invention claimed is:

1. A method of operation for a motor vehicle powertrain including a fluid coupling having input and output members, an internal combustion engine coupled to said input member and a power transmission having an input coupled to said output member, comprising the steps of:
   detecting a neutral idle condition for which a temperature of said engine is lower than desired;
   activating at least one selectively engageable friction device of said power transmission to prevent rotation of said output member without establishing a drive connection between said output member and an output of said transmission, to thereby load said engine for increasing said temperature;
   measuring a temperature of fluid in said transmission;
   measuring a speed of said engine;
   determining a slip speed between said input member and said output member;
   estimating said temperature of fluid in said fluid coupling based on the measured temperature of fluid in said transmission, the measured speed of said engine and the determined slip speed; and
   deactivating said at least one friction device to initiate a cool down mode when a temperature of fluid in said fluid coupling exceeds a threshold value.

2. The method of claim 1, including the step of:
   disabling activation of said at least one friction device for at least a predetermined period of time following deactivation of said at least one friction device.

3. The method of claim 1, wherein the step of detecting said neutral idle condition includes the step of:
   detecting that a coolant temperature of said engine is below a threshold temperature.

4. The method of claim 1, wherein the step of detecting said neutral idle condition includes the step of:
   detecting a warm-up request generated by an engine controller.

5. The method of claim 1, including the steps of:
   re-activating said at least one friction device to terminate said cool down mode a predetermined time after initiation of said cool down mode.

6. The method of claim 1, including the steps of:
   establishing enable conditions for activating said at least one friction device;
   activating said at least one friction device when said neutral idle condition is detected and said enable conditions are met;
   deactivating said at least one friction device when said neutral idle condition is not detected; and
   deactivating said at least one friction device when said enable conditions are not met.

7. The method of claim 6, wherein said enable conditions include detecting that a range selector of said transmission is in a Park position.

8. The method of claim 6, wherein said enable conditions include detecting that a vehicle service brake is released.

9. The method of claim 1, including the steps of:
   establishing enable conditions for activating said at least one friction device;
   activating said at least one friction device in response to an engine warm up request when said neutral idle condition is detected and said enable conditions are met;
   deactivating said at least one friction device when said neutral idle condition is not detected; and
   deactivating said at least one friction device when said enable conditions are not met.

10. The method of claim 9, including the step of:
    indicating an activation status of said at least one friction device.

11. The method of claim 1, including the steps of:
determining an offset temperature based on the measured speed of said engine and the determined slip speed; and
estimating said temperature of fluid in said fluid coupling based on a sum of said offset temperature and the measured temperature of fluid in said transmission.

12. The method of claim 11, including the step of:
limiting said offset temperature to values between zero and a calibrated maximum offset temperature.

* * * * *